Dec. 26, 1950     W. F. ROBERTS     2,535,457
MOVING TRUCK
Filed Aug. 5, 1949
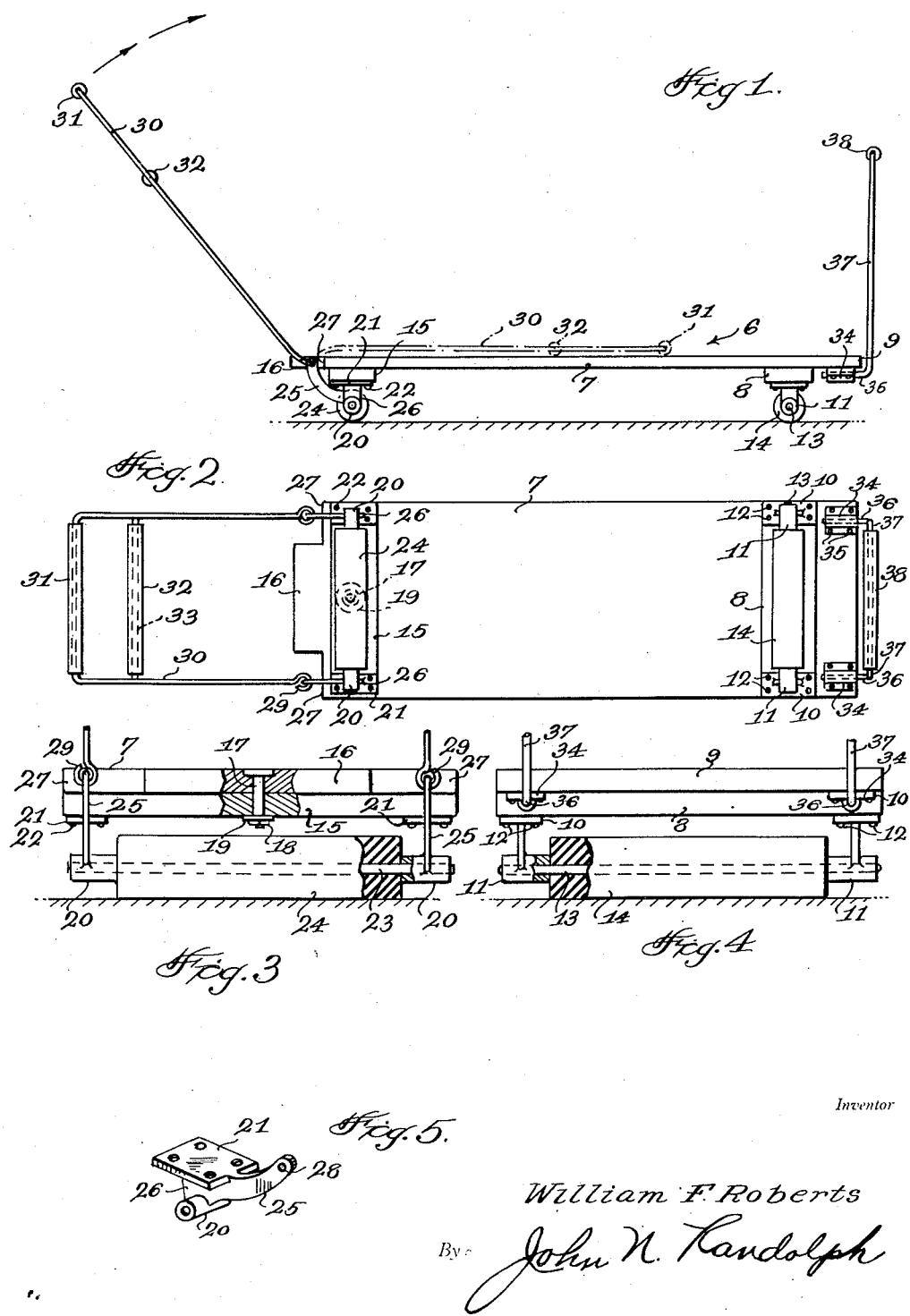
Inventor
William F. Roberts
By John N. Randolph
Attorney Patented Dec. 26, 1950

2,535,457

UNITED STATES PATENT OFFICE 2,535,457

MOVING TRUCK

William F. Roberts, Crawford, Nebr.

Application August 5, 1949, Serial No. 108,815

4 Claims. (Cl. 280—47)

This invention relates to a novel construction of moving truck primarily intended for commercial use in moving, loading and unloading heavy articles such as household furniture, refrigerators, pianos, heating and cooking stoves, machines and containers of heavy weight such as crates, boxes and barrels.

More particularly, the primary object of the present invention is to provide a moving truck of extremely simple construction which will greatly facilitate the handling and moving of heavy articles and which has an extremely low center of gravity enabling heavy articles to be readily lifted thereon or lifted therefrom and which substantially eliminates any danger of the truck or an article supported thereby overturning.

Still another object of the invention is to provide a moving truck having wide rollers for engaging a supporting surface to distribute the weight borne by the truck over a maximum area and which are constructed to positively prevent marring or otherwise injuring floor surfaces or the like.

Still a further object of the invention is to provide a moving truck of extremely simple construction, which is comparatively light in weight relatively to the load which it is capable of supporting, which is extremely easy to use and operate and which is provided with a novel arrangement of handles for pulling and lifting the truck and which are capable of being disposed in a folded position when the truck is not in use and so that it will occupy a minimum of space.

Various other objects and advantages of the invention will hereinafter become more fully apparent from the following description of the drawing, illustrating a presently preferred embodiment thereof, and wherein:

Figure 1 is a side elevational view showing the truck in a position for use;

Figure 2 is a bottom plan view, partly in section thereof;

Figure 3 is a fragmentary front elevational view, partly in section of the truck;

Figure 4 is a similar rear elevational view thereof, and

Figure 5 is a perspective view of one of the dual brackets of the truck, shown detached.

Referring more specifically to the drawing, the novel moving truck in its entirety is designated generally 6 and includes a platform 7 which may be formed of wood or any other suitable material of sufficient strength to bear the heavy load that the truck 6 is intended to support and the overall length and width of which may vary as well as the thickness thereof, depending upon the size and weight of the articles to be supported by the truck.

A supporting cross member 8 which is likewise preferably formed of wood is disposed across the underside of the platform 7 adjacent one end thereof which constitutes the rear end 9 of the truck 6. The base 10 of a depending bearing 11 is secured to the underside of each end of the cross member 8 by suitable fastenings 12 which extend therethrough and into or through the platform 7 for securing the cross member 8 to the platform. The bearings 11 are secured one adjacent each end of the cross member 8 and in transverse alignment for journaling therein the ends of a shaft 13 the intermediate portion of which extends axially through a roller 14 and which is secured therein. The roller 14 is preferably formed of a relatively hard rubber.

A front cross member or truck element 15 is swivelly mounted intermediate of its ends beneath the platform 7 near its opposite, forward end 16 by a kingbolt 17 which extends downwardly through the platform 7 and through the intermediate portion of the truck element 15 and which is turnably disposed in said truck element and held in engagement therewith by a nut 18 and a washer 19. The head of the kingbolt 17 is preferably countersunk in the platform 7, as seen in Figure 3.

The cross member or truck element 15 supports a pair of depending bearings 20 having base portions 21, corresponding to the bases 10 and which are secured to the ends of the cross member 15 by fastenings 22, which fastenings do not engage the platform 7, so that said platform is connected to the truck element 15 solely by the kingbolt 17 and nut 18 for swivelly mounting the truck element 15 relatively to the platform. The normally transversely aligned bearings 20, which correspond to the bearings 11 journal the ends of a shaft 23 the intermediate portion of which extends axially through and is secured in a roller 24, corresponding to the roller 14 and on which the forward portion of the platform 7 is supported.

The supporting brackets or hangers for the front bearings 20 differ from those of the rear bearings 11 in that each is provided with an integral extension 25, as best illustrated in Figure 5, which extension or arms extend forwardly and are curved upwardly with respect to the hanger portions 26 which support the bearings 20 and which depend from the bases 21 thereof. The extensions or arms 25 extend forwardly and upwardly into notches 27 in the two front corners of the platform 7 and each of said arms 25 is apertured adajacent its free end as seen at 28 to loosely engage an eye 29 of a substantially U-shaped handle 30 which is preferably formed of an iron rod, said eyes 29 constituting the terminals of the legs thereof. The U-shaped handle 30, as best illustrated in Figure 2, is provided with a rubber sleeve 31 which is turnably mounted on its intermediate, free end portion to form a hand grip. A similar sleeve 32, forming a second hand grip is turnably mounted on a cross rod 33 which extends between and is suitably secured to the legs of the handle 30, near its intermediate or bight portion which is engaged by the hand grip 31. As best illustrated in Figure 1, the free ends of the arms 25 extend to adjacent the upper surface of the platform 7 and the legs of the handle 30 are curved slightly adjacent their terminals or eyes 29 so that the handle 30, when not in use, may be disposed on the platform 7 as illustrated in dotted lines in Figure 1. The notches 27 additionally function to limit the extent that the truck element 15 and its roller 24 may turn relatively to the platform 7 by engagement of one or the other of said arms 25 with the inner end wall of one or the other of the notches 27.

A pair of corresponding socket members 34 are secured by fastenings 35 to the underside of the platform 7 adjacent its rear end 9 and so that said sockets 34 open outwardly of the rear of the truck 6 for detachably receiving corresponding right angularly disposed ends or terminals 36 of a substantially U-shaped handle 37 which extends upwardly from beyond and adjacent the rear end 9 of the platform and which is provided with a sleeve 38 forming a hand grip, corresponding to the sleeve 31 or 32, which is rotatably mounted on the upper, intermediate portion of the handle 37. The terminals 36 of the handle 37 are disposed sufficiently loose in the sockets 34 to enable them to be slidably disengaged therefrom for thereby demountably supporting the handle 37 on the truck 6.

From the foregoing it will be readily apparent that a moving truck of extremely simple construction has been provided having a very low center of gravity which will prevent its overturning and which will enable heavy articles to be readily lifted onto its supporting platform 7 or removed therefrom. The handle 30 can be utilized for pulling and guiding the moving truck 6 by the operator or operators grasping the hand grips 31 and 32, the notches 27 limiting the extent of turning movement of the swivelly mounted roller 24 for steering the truck to prevent turning the truck too sharp in either direction. The wide rubber rollers 14 and 24 on which the truck 6 and the load borne thereby is supported will effectively prevent marring of a floor or other surface yet will allow the truck to roll freely. The auxiliary handle 37 is utilized by grasping its hand grip 38 for lifting the rear end of the truck over obstructions and may in addition be utilized for pushing the truck. When not in use, said handle 37 can be readily removed and laid on the platform 7 and the handle 30 may be swung to a folded position against the top of the platform as illustrated in dotted lines in Figure 1, so that truck 6 can be stored in a minimum of space. The truck 6 is relatively light in weight and may obviously be made in various sizes depending upon the size and weight of the articles or loads to be carried thereby.

Various modifications and changes are contemplated and may obviously be resorted to, without departing from the spirit or scope of the invention as hereinafter defined by the appended claims.

I claim as my invention:

1. A moving truck for heavy articles comprising an elongated platform having a front end and a rear end, bearing means secured to and depending from said platform adjacent its rear end and transversely thereof, an elongated roller, a shaft extending axially therethrough and having ends protruding from the ends thereof and journaled in said bearing means and transversely of the platform for supporting the rear end of the truck platform, a truck element swivelly mounted intermediate of its ends on the underside of said platform adjacent its forward end and centrally of its side edges, a bearing bracket secured to and depending from said truck element adjacent each of its ends, said bearing brackets having aligned bearings, a second elongated roller, a second shaft having its intermediate portion extending axially through said second roller and fixed therein and having its ends journaled in the bearings of said bearing brackets, each of said bearing brackets including a forwardly extending upwardly curved arm, and a substantially U-shaped handle having terminal portions of the legs thereof pivotally connected to said arms, said handle being adapted to be manually engaged for pulling and steering the truck, the corners of the forward end of said platform being cut away to provide notches into which the free ends of said arms extend for limiting the swivel movement of the truck element relatively to the platform.

2. A moving truck for heavy articles comprising an elongated platform having a front end and a rear end, bearing means secured to and depending from said platform adjacent its rear end and transversely thereof, an elongated roller, a shaft extending axially therethrough and having ends protruding from the ends thereof and journaled in said bearing means and transversely of the platform for supporting the rear end of the truck platform, a truck element swivelly mounted intermediate of its ends on the underside of said platform adjacent its forward end and centrally of its side edges, a bearing bracket secured to and depending from said truck element adjacent each of its ends, said bearing brackets having aligned bearings, a second elongated roller, a second shaft having its intermediate portion extending axially through said second roller and fixed therein and having its ends journaled in the bearings of said bearing brackets, each of said bearing brackets including a forwardly extending upwardly curved arm, and a substantially U-shaped handle having terminal portions of the legs thereof pivotally connected to said arms, said handle being adapted to be manually engaged for pulling and steering the truck, and a hand grip comprising a rubber sleeve member turnably mounted on the intermediate portion of said U-shaped handle, said handle having a rod extending transversely between the legs thereof and spaced from but disposed adjacent to said hand grip, and a second hand grip comprising a rubber sleeve rotatably disposed on said rod.

3. A moving truck for heavy articles comprising an elongated platform having a front end and a rear end, bearing means secured to and depending from said platform adjacent its rear end and transversely thereof, an elongated, roller, a shaft extending axially therethrough and having ends protruding from the ends thereof and journaled in said bearing means and transversely of the platform for supporting the rear end of the truck platform, a truck element swivelly mounted intermediate of its ends on the underside of said platform adjacent its forward end and centrally of its side edges, a bearing bracket secured to and depending from said truck element adjacent each of its ends, said bearing brackets having aligned bearings, a second elongated roller, a second shaft having its intermediate portion extending axially through said second roller and fixed therein and having its ends journaled in the bearings of said bearing brackets, each of said bearing brackets including a forwardly extending upwardly curved arm, and a substantially U-shaped handle having terminal portions of the legs thereof pivotally connected to said arms, said handle being adapted to be manually engaged for pulling and steering the truck, said handle being swingable to a folded, inoperative position against the upper surface of the platform.

4. A moving truck for heavy articles comprising an elongated platform having a front end and a rear end, bearing means secured to and depending from said platform adjacent its rear end and transversely thereof, an elongated, roller, a shaft extending axially therethrough and having ends protruding from the ends thereof and journaled in said bearing means and transversely of the platform for supporting the rear end of the truck platform, a truck element swivelly mounted intermediate of its ends on the underside of said platform adjacent its forward end and centrally of its side edges, a bearing bracket secured to and depending from said truck element adjacent each of its ends, said bearing brackets having aligned bearings, a second elongated roller, a second shaft having its intermediate portion extending axially through said second roller and fixed therein and having its ends journaled in the bearings of said bearing brackets, each of said bearing brackets including a forwardly extending upwardly curved arm, and a substantially U-shaped handle having terminal portions of the legs thereof pivotally connected to said arms, said handle being adapted to be manually engaged for pulling and steering the truck, a pair of socket members secured to the underside of the truck platform adjacent its rear end and disposed longitudinally thereof, a second U-shaped handle having legs provided with substantially right angularly disposed terminals for detachably engaging said socket members for mounting said second handle in substantially an upright position beyond the rear end of the platform, said second handle being slidably detachable from the truck when not in use.

WILLIAM F. ROBERTS.

REFERENCES CITED

The following references are of record in the file of this patent:

UNITED STATES PATENTS

| Number | Name | Date |
| --- | --- | --- |
| 122,966 | Reynolds | Jan. 23, 1872 |
| 1,940,643 | Earnest | Dec. 19, 1933 |